United States Patent [19]

Solomon

[11] Patent Number: 4,684,918

[45] Date of Patent: Aug. 4, 1987

[54] LANE CHANGING SIGNALLING DEVICE

[76] Inventor: Allen C. Solomon, 3020 May St., Fort Worth, Tex. 76110

[21] Appl. No.: 796,481

[22] Filed: Nov. 5, 1985

Related U.S. Application Data

[63] Continuation-in-part of Ser. No. 479,692, Mar. 28, 1983, abandoned.

[51] Int. Cl.$^4$ ............ B60Q 1/26; B60Q 1/00; G08G 1/00
[52] U.S. Cl. .................. 340/73; 340/55; 340/76; 340/74; 200/61.27; 200/61.38
[58] Field of Search .......... 340/73, 55, 67, 76, 340/54, 22; 200/61.27, 61.28, 61.29, 61.38

[56] References Cited

U.S. PATENT DOCUMENTS

| | | |
|---|---|---|
| 1,287,080 | 12/1918 | Hanna . |
| 1,389,366 | 8/1921 | Loder . |
| 1,647,520 | 11/1927 | Hitchcock et al. . |
| 1,664,682 | 4/1928 | Hardman . |
| 2,106,660 | 1/1938 | Ross . |
| 2,589,410 | 4/1948 | Leete ........... 340/54 |
| 2,957,161 | 10/1960 | Daws ............ 340/73 |
| 3,571,537 | 3/1971 | Cook ............. 340/73 |
| 3,576,530 | 4/1971 | Buechler et al. ... 340/67 |
| 3,594,724 | 7/1971 | Evers ............ 340/81 |
| 4,368,454 | 1/1983 | Pilatzki .......... 340/22 |
| 4,438,425 | 3/1984 | Tsuchida et al. ... 340/22 |

Primary Examiner—James L. Rowland
Assistant Examiner—Ted Rittmaster
Attorney, Agent, or Firm—James E. Bradley

[57] ABSTRACT

A motor vehicle turn signal system has features to indicate lane changing. The system includes a flasher that supplies pulsated power to the conventional turn signal lever switch. Right and left push button switches are mounted to the steering wheel. Each button switch is linked to a relay coil. The relay coil, when energized, connects the flasher directly to the signal lights, bypassing the conventional turn signal lever switch. The connection between the flasher and the conventional turn signal lever switch is broken while the relay coil is energized. In one version, a transmitter mounted to the steering wheel transmits a signal to a receiver in the vehicle when a button switch is depressed.

5 Claims, 4 Drawing Figures

LANE CHANGING SIGNALLING DEVICE

CROSS-REFERENCE TO RELATED APPLICATION

This application is a continuation-in-part of application Ser. No. 479,692 filed Mar. 28, 1983, now abandoned.

BACKGROUND OF THE INVENTION

1. Field of the Invention

This invention relates in general to motor vehicle electrical circuits, and in particular to a lane changing signaling device.

2. Description of the Prior Art

Conventional motor vehicles have signal lights for indicating when turning. The system includes lights on the front and rear which are connected through a mechanical lever switch to a flasher unit that provides interrupted or pulsating power. The mechanical lever is mounted to the steering column next to the steering wheel. When depressed in one direction, contacts are made to connect the flasher with the signal lights on one side of the vehicle. Pulling upward on the lever toward the other direction causes the other signal lights to flash. A mechanism within the lever switch will retain the connection until the turn is completed, at which time the lever automatically returns to its neutral position.

While this is satisfactory for making 90 degree turns, the system has deficiencies in regard to using it to indicate changing lanes. When changing lanes, normally the turn is not sharp enough to cause the mechanism, in the lever switch to automatically return when the lane change is completed. To avoid inadvertently leaving the lever on, one must engage the lever only slightly to a point short of its locked position. Still, it is very common to see motorists driving with a signal light erroneously flashing. Also, even if this does not accidentally occur, passing a car requires up to four movements of one's hand from the wheel to the lever. This is particularly a nuisance for persons that do a considerable amount of freeway driving, such as truck drivers.

U.S. Pat. No. 3,594,724, George A. Evers, issued July 20, 1971, shows a lane changing signal device that incorporates buttons on the steering wheel in conjunction with the conventional mechanical lever. The buttons provide a flashing signal when depressed. This allows one to change lanes without removing one's hands from the steering wheel. Also, it reduces the chances for inadvertently leaving the turn signal lever on.

U.S. Pat. No. 3,576,530, William R. Buechler et al., also shows a dual system. In both patents, it appears that both the lever and the push buttons could simultaneously operate. This might provide erroneous flashing on both sides of the vehicle, or no flashing at all. Both occurrences could lead to a dangerous situation. Also, both patents require the installation of slip rings to interconnect the button switches with the turn signal lights.

SUMMARY OF THE INVENTION

In this invention, a lane change signaling device is provided that enables the operator to signal when changing lanes without removing his hands from the steering wheel. The signaling device includes buttons mounted to the steering wheel that cause the signal lights to flash until pressure is removed. Also, when the signal lights are depressed, disabling means disables the conventional turn lever so that erroneous or conflicting signals cannot occur.

The system includes a relay coil for each button that actuates three relay switches. Two of the relay switches, when in the normal position, connect the conventional turn signal lever to the flashing unit and to the signal lights. In the energized position, the relay switches connect the flashing unit directly to the signal lights, independent of the position of the turn lever. The third switch for each relay coil breaks the connection between the flashing unit and the turn signal lever when the relay coil is energized.

In one embodiment, the button switches are interconnected with the relay switches with slip rings. In another embodiment, the button switches are connected to a transmitter mounted to the steering wheel. A receiver mounted in the vehicle receives the signal which occurs when a button switch is depressed, and is connected to the relay coil to energize selected signal lights.

DESCRIPTION OF THE PREFERRED EMBODIMENT

Figure 1:
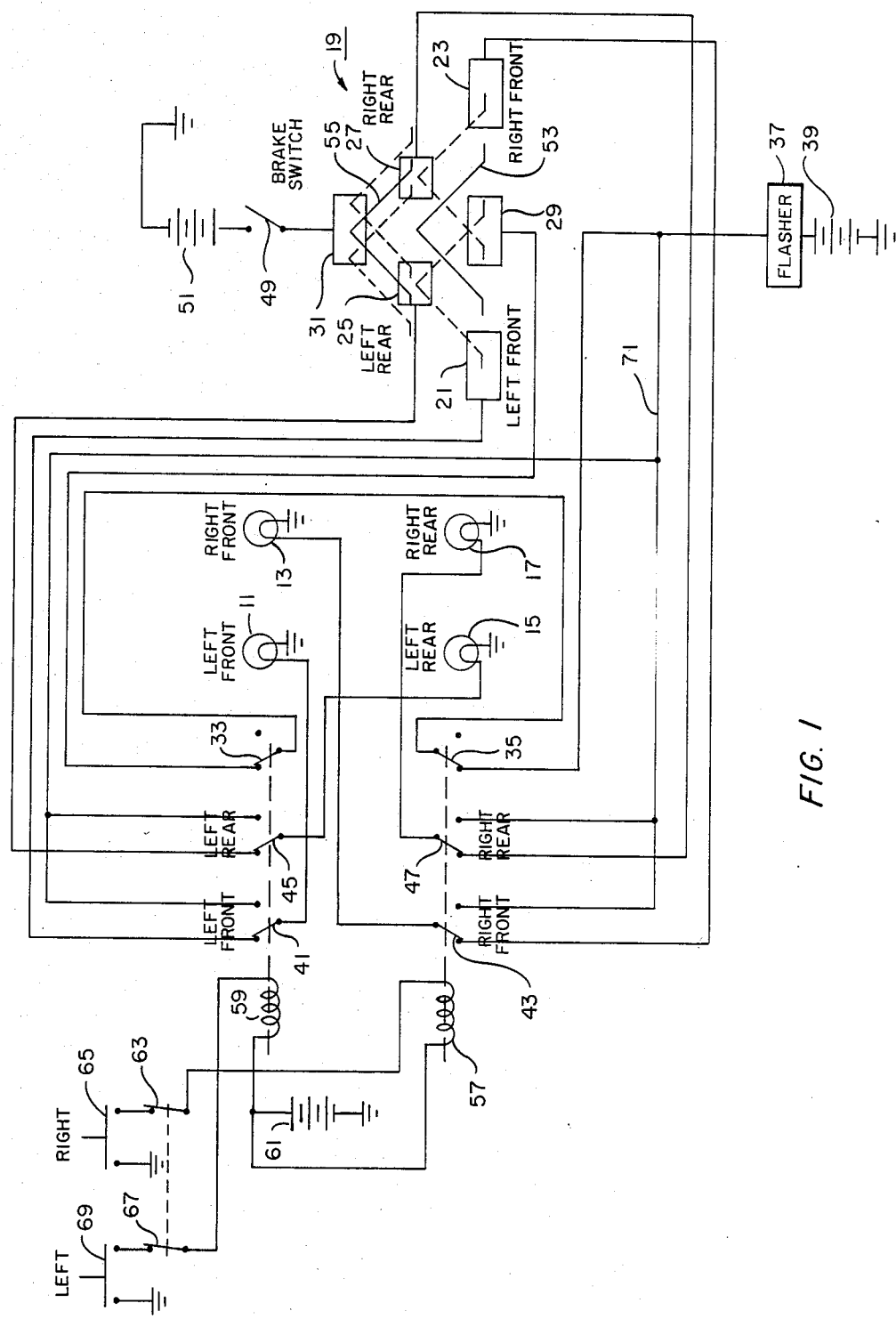
FIG. 1 is an electrical schematic of the lane change signal device of this invention.

Referring to FIG. 1, the system includes a left front signal light or lamp 11 mounted to the vehicle. Similarly, a right front light 13, left rear light 15, and right rear light 17 are mounted to the vehicle. The vehicle also has a conventional turn signal lever switch 19. Lever switch 19 has a left front contact 25 and a right rear contact 27. A power contact 29 is located at the bottom center. A brake switch contact 31 is located at the top center.

Two disabling relay switches 33 and 35 are connected in a series between power contact 39 and a flasher 37. Relay switches 33 and 35 operate independently of each other and both are shown in the normal, closed position. In the open position, connection between power contact 29 and flasher 37 is broken. Flasher 37 is a conventional flashing unit connected to a battery source 39. Flasher 37 provides interrupted or pulsated power to power contact 29 for causing the signal lights to flash.

The left front contact 21 is connected to a left front relay switch 41, which in turn is connected to left front light 11. Right front contact 23 is connected to a right front switch 43, which in turn is connected to right front light 13.

Left rear contact 25 is connected to a left rear relay switch 45, which is connected to left rear light 15. Right rear contact 27 is connected to a right rear relay switch 47, which is connected to right rear light 17. In the closed position shown in FIG. 1, each of the contacts 21, 23, 25 and 27 is directly connected to its respective signal light 11, 13, 15 and 17. In the open position (not shown), these connections are broken.

The turn signal lever switch 19 further includes a brake switch 49 which is normally open and connected to a battery source 51. When brake switch 49 is closed, power is provided to brake switch contact 31.

Lever switch 19 further includes two wipers 53 and 55 which are symbolically shown to be in a triangular configuration. Wipers 53 and 55 move in unison with each other and are connected to the turn signal lever (not shown), such that when the turn signal lever is pushed upward to indicate a right turn, both move to the right as shown by the dotted lines. In turning left, both wipers move to the left as shown by the other dotted lines. The contacts are spaced such that when in the neutral position, shown by the solid lines, lower wiper 53 is out of engagement with any of the contacts. Upper wiper 55 will connect brake switch contact 31 with the rear contacts 25 and 27. Upper wiper 55 connects the brake switch contact 31 with the left rear contact 25. In the left turn position, lower wiper 53 connects the power contact 29 with the left contacts 21 and 25. Upper wiper 55 connects the brake switch contact 31 with the right rear contact 27.

The relay switches 35, 43 and 47 are all shifted in unison by means of a relay coil 57. Relay switches 33, 41 and 45 are all shifted in unison by means of a relay coil 59. Relay coil 57 has one side connected to a battery source 61 and another side connected to a deactivating switch 63, which in turn is connected to one side of a depressable button switch 65. The other side of button switch 65 is connectd to ground. Similarly, one side of relay coil 59 is connected to battery source 61 and the other side is connected to a deactivating switch 67. Switch 67 is connected to one side of a depressable button switch 69. The other side of the left button switch 69 is connected to ground. Deactivating switches 63 and 67 are normally closed, as shown, and are manually moved to an open position in unison, as indicated by the dotted lines. Battery sources 39, 51, and 61 all lead to a conventional vehicle battery (not shown).

When relay switch 57 is energized, switches 35, 43 and 47 will move to the opposite position shown. In the opposite position, the right relay switches 43 and 47 connect the right signal lights 13 and 17 directly to a lead 71, which is connected to flasher 37. The opposite contacts of the left relay switches 41 and 45 are also connected to lead 71, which is connected to flasher 37.

Figure 2:
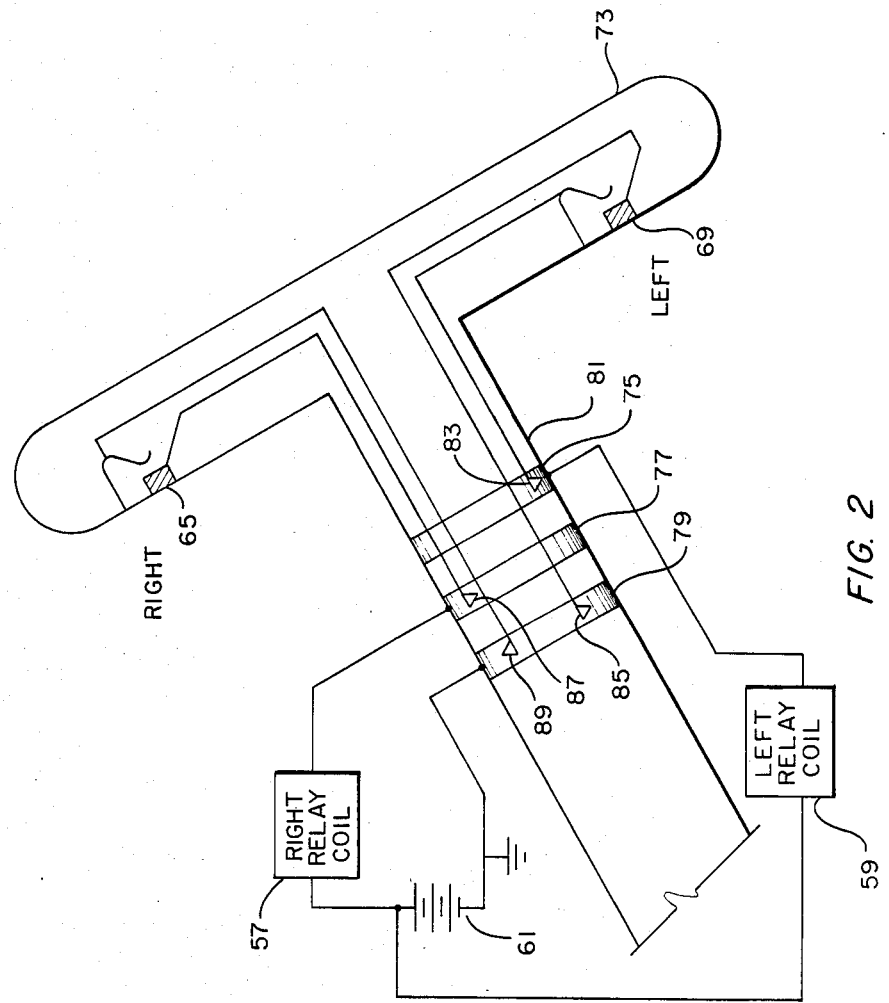
FIG. 2 is a schematic representation of the buttons and slip rings of this invention attached to a steering wheel and steering column.

Referring to FIG. 2, button switches 65 and 69 are mounted to steering wheel 73 for movement therewith. Normally, switches 65 and 69 will be mounted on opposite sides of the wheel. A variety of mounting devices could be used. Three slip rings 75, 77 and 79 are mounted to a stationary part of a steering column 81. Slip rings 75, 77 and 79 are annular strips of electrically conductive material, spaced-apart from each other and insulated from the steering column 81. Slip ring 75 is connected to one side of the left relay coil 59, which has its opposite side connected to battery source 61. Slip ring 77 is connected to one side of right relay coil 57, which has its opposite side connected to battery source 61. Slip ring 79 is connected to ground.

Left button switch 69 has one side connected to a brush 83 that rotates with steering wheel 73 and slidingly engages slip ring 75. The opposite side of button switch 69 is connected to a brush 85, which rotates with steering wheel 73 and slidingly engages slip ring 79. Right button switch 65 has one side connected to brush 87, which rotates with steering wheel 73 and slidingly engages slip ring 77. The opposite side of right button switch 65 is connected to a brush 89 that slidingly engages slip ring 79.

In operation, when one wishes to make a lane change to the left, left button switch 69 will be depressed as shown in FIG. 2. This completes the circuit between battery source 61, left relay coil 59 and ground. Energizing left relay coil 59 causes relay switches 33, 41 and 45 to move to the position opposite that is shown in FIG. 1. In this position, relay switch 33 opens the connection between flasher 37 and power contact 29 of lever switch 19. In the energized position, relay switches 41 and 45 connect flasher 37 to the left signal lights 11 and 15. Pulsating power is provided to the signal lights 11 and 15, causing them to flash so long as button 69 is depressed. When button 69 is released, relay switches 33, 41 and 45 shift back to the deenergized position. This removes from the left signal lights 11 and 15 the pulsated power provided by flasher 37.

To change lanes to the right, depressing the right button switch 65 causes the right signal lights 13 and 17 to flash in the same manner. Relay switches 43 and 47 will move to the energized position, connecting flasher 37 with the signal lights 13 and 17. Relay switch 35 will move to the open position, removing the connection between power contact 29 and flasher 37 and disabling lever switch 19.

While either right button switch 65 or left button switch 69 is depressed, brake switch 49 will still operate. Depressing the brake pedal (not shown), provides power to brake contact 31. If one is making a left lane change and depresses the brake pedal, the power on brake switch contact 31 is transmitted through wiper 55 to right rear contact 27, which is connected to the right rear light 17 through the deenergized position of relay switch 47. The right rear signal light 17 would thus remain on so long as the brake pedal is depressed, while the left rear signal light 15 would flash because of the depression of left button switch 69. For a right lane change, depressing the brake pedal will cause the left rear signal light 15 to remain on in the same manner.

The conventional lever switch 19 can be used at any time the button switches 65 and 69 are not used. Pulsating power from flasher 37 will be constantly applied to the power contact 29 because of the closed positions of the disabling relay switches 33 and 35. For making a right turn with the turn signal lever switch 19, wiper 53 connects the right contacts 23 and 27 with the power contact 29, causing the right signal lights 13 and 17 to flash. In a left turn position, wiper 53 connects power contact 29 to the left contacts 21 and 25, which cause the left lights 11 and 15 to flash. The brake switch 49 will provide a braking indication during a turn to the nonflashing rear light in the same manner as previously discussed. If desired to completely disconnect the buttons 65 and 69, such as for in town driving, deactivating switches 63 and 67 can be opened.

Figure 3:
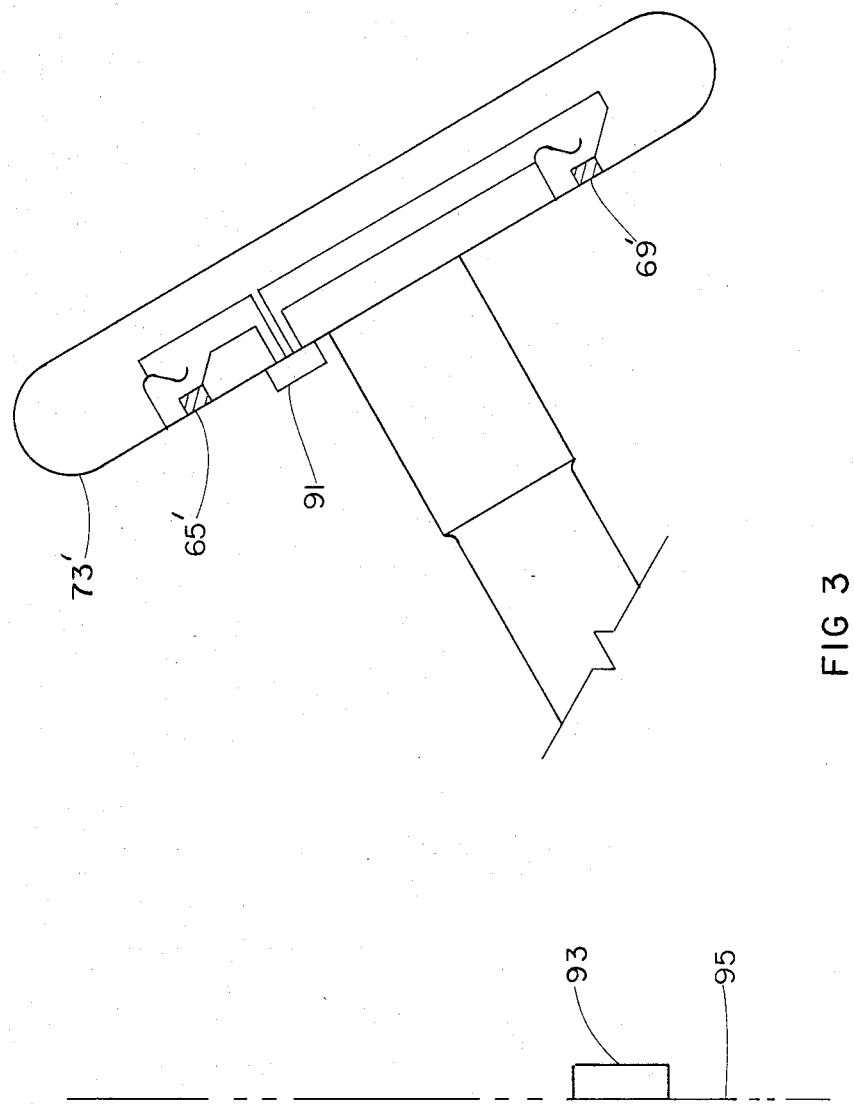
FIG. 3 is a schematic representation of the buttons and a transmitter attached to a steering wheel in a second embodiment of the invention.

FIG. 3 shows a second embodiment of the invention. In the second embodiment, the elements which are common to the elements in the first embodiment will be shown by the prime symbol and will not be discussed in detail. In this embodiment, the slip rings 75, 77, and 79 (FIG. 2) are eliminated. The push buttons 65' and 69' are connected to a conventional low power transmitter 91. Transmitter 91 is mounted to the steering wheel 73' so that it rotates with the steering wheel 73' and the push buttons 65' and 69'. Transmitter 91 is powered by its own small dry cell DC battery (not shown) and is preferably an LM 1871 transmitter.

It has two channels which transmit digital coded signals. In the preferred embodiment, the transmitter 91 operates at 49 mhz. When one of the buttons 65' and 69' is depressed, it will transmit a coded pulse having three square pulses in a 9.5 milisecond interval. When the other push button 65' or 69' is depressed, it will transmit four square pulses in a 9.5 milisecond interval.

Figure 4:
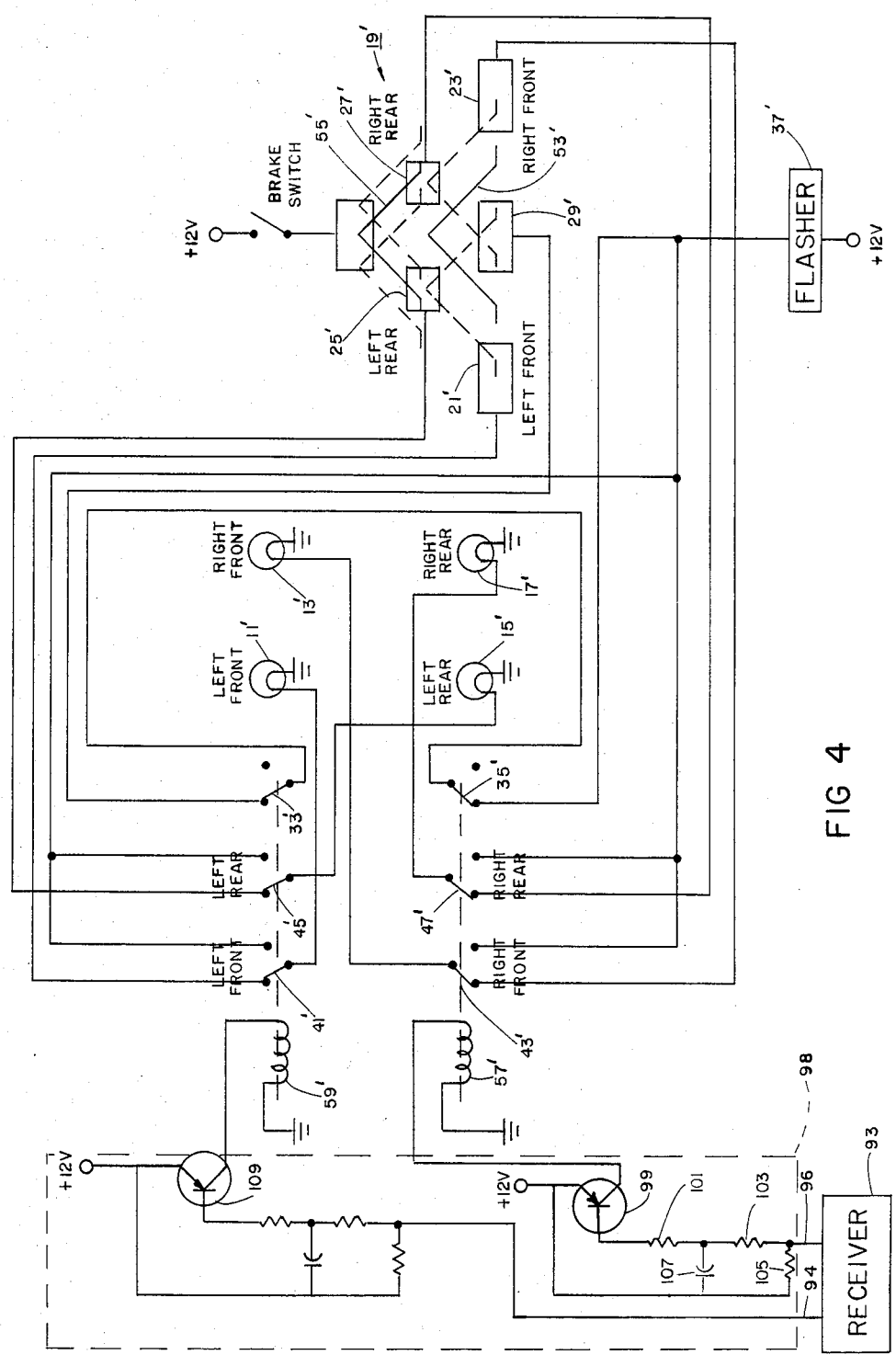
FIG. 4 is an electrical schematic of the second embodiment of the invention.

A matching receiver 93 is mounted to the firewall 95 of the vehicle, which is only two to three feet away from the transmitter 91. In the preferred embodiment, the receiver is an LM 1872 receiver. It provides two digital outputs corresponding to the inputs received. Referring to FIG. 4, if the transmitted signal is a three pulse train, it provides an output on line 94. The output is also a square pulse output with three pulses every 9.5 miliseconds. If the receiver 93 has received a four pulse train signal from transmitter 91 (FIG. 3), it outputs a four pulse train output every 9.5 miliseconds on a line 96.

Lines 94 and 96 are connected to an interface circuit 98. Interface circuit 98 has a driver transistor 99. Transistor 99 has its base connected conventionally through two resistors 101 and 103 to the output line 96. The emitter is connected to a 12 volt source, which will be the vehicle battery. The emitter is also connected to line 96 through a resistor 105 and a capacitor 107 in parallel. The collector leads to relay 57'.

Similarly, the interface circuit 98 has a transistor 109 which is connected to the output line 94 in a manner identical to the transistor 99. Transistor 109 is connected to relay 59'.

In the operation of the second embodiment, if the left push button 69' is depressed, it causes the transmitter 91 to transmit a digital, coded pulse train which is received by the receiver 93. The receiver 93 will provide an output on its output line 94, which is also digital. The digital output causes the transistor 109 to saturate, providing 12 volt power continuously to the relay 59' so long as the button 69' is depressed. Relay 59', as previously discussed, causes the switches 41', 45' and 33' to switch to the position opposite that shown in FIG. 4. This connects the pulsated power from the flasher 37' to the left front 11' and left rear 15' lamps. The disabling switch 33' interrupts the pulsating power being supplied to the turn signal lever power contact 29', preventing any operation should the turn signal lever wiper 55' be moved into contact with any of the light contacts 21', 23', 25' or 27'. If the right button 65' (FIG. 3) is depressed, the same applies, but to the right front 13' and right rear 17' lamps.

The invention has significant advantages. The circuit disables the conventional lever switch circuitry when the button switch circuits are being utilized. The transmitter and receiver of the second embodiment avoids the need for slip rings. The device can be readily connected to existing systems both during manufacturing of the vehicle and afterward.

While the invention has been shown in only one of its forms, it should be apparent to those skilled in the art that it is not so limited but is susceptible to various changes without departing from the scope of the invention.

I claim:

1. In a motor vehicle having a steering wheel, a battery, flasher means connected to the battery for supplying pulsated power to turn signal switch means for connecting the pulsated power to selected signal lights, the turn signal switch means having a power contact connected to the flasher means, light contacts connected to selected turn signal lights, and a turn signal lever wiper that connects the power contact with selected ones of the light contacts when manually shifted, an improved signal means for indicating lane changing, comprising in combination:

right and left push button switches, each mounted to opposite sides of the steering wheel;

circuit means interconnecting the button switches with selected ones of the signal lights and with the flasher means to indicate lane changing by supplying pulsated power to selected ones of the signal lights from the flasher means when one of the button switches is depressed; and disabling means connected to the circuit means for automatically interrupting the connection between the flasher means and the power contact of the turn signal switch means when one of the button switches is depressed, so as to prevent the turn signal lever wiper from supplying pulsated power to one of the light contacts while pulsated power is simultaneously being supplied to one of the signal lights from the flasher means by the circuit means and one of the button switches.

2. The signal means according to claim 1 wherein the disabling means comprises a relay switch connected between the power contact and the flasher means;

the circuit means having relay means for energizing the relay switch to open the circuit between the flasher means and power contact when one of the button switches is depressed.

3. In a motor vehicle having a steering wheel, a battery, flasher means connected to the battery for supplying pulsated power to turn signal switch means for connecting the pulsated power to selected signal lights, the turn signal switch means having a power contact connected to the flasher means, light contacts connected to selected turn signal lights, and a turn signal lever wiper that connects the power contact with selected ones of the light contacts when manually shifted, an improved signal means for indicating lane changing, comprising in combination:

right and left push button switches each mounted to opposite sides of the steering wheel;

transmitter means mounted to the steering wheel for transmitting a first signal when one of the buttons is depressed and a second signal when the other of the buttons is depressed;

receiver means mounted in the vehicle for receiving the signals and providing an output on one output line if the first signal is received and an output on another output line if the second signal is received;

circuit means interconnecting the output lines of the receiver means with selective ones of the signal lights and with the flasher means to indicate lane changing by supplying pulsated power to selective ones of the signal lights from the flasher means when one of the buttons which is depressed; and disabling means connected to the circuit means for automatically interrupting the connection between the flasher means and the power contact of the turn signal switch means when one of the buttons which is depressed, so as to prevent the turn signal lever wiper from supplying pulsated power to one of the light contacts while pulsated power is simultaneously being supplied to one of the signal lights from the flasher means by the circuit means and one of the button switches.

4. The signal means according to claim 3 wherein the disabling means comprises a relay switch connected between the power contact and the flasher means;
   the circuit means having relay means for energizing the relay switch to open the circuit between the flasher means and power contact when one of the button switches is depressed.

5. The signal means according to claim 3 wherein the circuit means comprises relay switch means having two relay coils, each for actuating a relay switch for completing a circuit from the flasher means to selected ones of the signal lights when one of the button switches is depressed.

* * * * *